United States Patent [19]
Yamamuro

[11] Patent Number: 5,664,141
[45] Date of Patent: Sep. 2, 1997

[54] DISK DRIVE SYSTEM USING RECEIVED ADDRESS FOR SELECTING DISK PROCESSING FORMAT

[75] Inventor: Mikio Yamamuro, Zushi, Japan

[73] Assignee: Kabushiki Kaisha Toshiba, Kawasaki, Japan

[21] Appl. No.: 550,473

[22] Filed: Oct. 30, 1995

[30] Foreign Application Priority Data

Oct. 31, 1994 [JP] Japan .................................. 6-267768

[51] Int. Cl.⁶ .................................................. G06F 13/00
[52] U.S. Cl. ........................... 711/111; 395/823; 369/15; 711/4
[58] Field of Search ................................. 395/438, 823, 395/404; 369/15

[56] References Cited

U.S. PATENT DOCUMENTS 5,371,723  12/1994  Sakurada ................................ 369/15
5,448,700   9/1995  Kim ................................. 395/438 X

*Primary Examiner*—David L. Robertson
*Attorney, Agent, or Firm*—Cushman, Darby & Cushman IP Group of Pillsbury Madison & Sutro LLP

[57] ABSTRACT

A host computer transmits to a disk drive an address or an ID number representing a disk to be used, and the disk drive receives from the host computer the address or ID number representing the disk to be used, wherein when the received address or ID number representing the disk represents a CD-ROM, a reading process for the CD-ROM is executed, and when the received address or ID number presenting the disk represents an R/W-OD, a writing process or a reading process for the R/W-OD is executed.

14 Claims, 3 Drawing Sheets

DISK DRIVE SYSTEM USING RECEIVED ADDRESS FOR SELECTING DISK PROCESSING FORMAT

BACKGROUND OF THE INVENTION

1. Field of the Invention

The present invention relates to a disk drive system wherein a disk drive for treating a read-only disk and a readable/writable disk is connected via a bus to a host computer for controlling the disk drive and commands and data are transmitted between the host computer and the disk drive via the bus.

2. Description of the Related Art

Recently a disk drive system has been put to practical use, which is of the type wherein a disk drive for treating a read-only disk (CD-ROM) and a disk drive for treating a readable/writable optical disk (R/W-OD) are selectively connected via a bus to a host computer for controlling the selected disk drive to transmit commands and data between the host computer and the selected disk drive via the bus.

Besides, a disk drive system has been put to practical use, which is of the type wherein a disk drive for treating a readable/writable optical disk (R/W-OD) is connected via a bus to a host computer for controlling the disk drive and commands and data are transmitted between the host computer and the disk drive via the bus.

However, there has been no system wherein a single disk drive can treat selectively a read-only disk or a compact disk ROM (CD-ROM) and a readable/writable optical disk (R/W-OD).

In the case of the CD-ROM, the signal read from the CD-ROM should be subjected to signal processing and data processing corresponding to the format of the CD-ROM as read-only disk, thereby reproducing data. In the case of the R/W-OD, data fed from a host computer should be recorded on the R/W-OD in accordance with the format thereof, or data on the disk is read and sent to the host computer.

The host computer, however, cannot determine whether the currently loaded disk is the CD-ROM or R/W-OD. Thus, the host computer inquires of the disk drives whether the loaded disk is the CD-ROM or R/W-OD. Based on a response from the disk drives, the host computer chooses a command to be used and transmits it to one of the disk drive. Consequently, the structure of the disk drive system and the soft processing on the host computer side becomes complex and the load of software processing increases.

SUMMARY OF THE INVENTION

The object of the present invention is to provide a disk drive system wherein the host computer does not need to confirm which disk is loaded in a single disk drive, the software processing on the host computer side is simple and the load of the software processing is reduced.

According to one aspect of the present invention, there is provided a disk drive system in which a single disk drive for treating a read-only disk and a readable/writable disk is connected via a bus to a host computer for controlling the disk drive and commands and data are transmitted between the host computer and the disk drive via the bus, wherein the disk drive comprises:

receiving means for receiving from the host computer the data representing the disk to be used;

first process means for performing a reading process for the read-only disk;

second process means for performing one of a writing process and a reading process for the readable/writable disk; and execution means for enabling the first process means to perform the reading process for the read-only disk when the data representing the disk to be used, which data is received by the receiving means, represents the read-only disk, and enabling the second process means to perform one of the writing process and the reading process for the readable/writable disk when the data representing the disk to be used, which data is received by the receiving means, represents the readable/writable disk.

According to another aspect of the present invention, there is provided a disk drive system in which a single disk drive for treating a read-only disk and a readable/writable disk is connected via a bus to a host computer for controlling the disk drive and commands and data are transmitted between the host computer and the disk drive via the bus, wherein the host computer comprises transmission means for transmitting to the disk drive data representing a disk to be used, and the disk drive comprises:

receiving means for receiving from the host computer the data representing the disk to be used;

first process means for performing a reading process for the read-only disk;

second process means for performing one of a writing process and a reading process for the readable/writable disk; and execution means for enabling the first process means to perform the reading process for the read-only disk when the data representing the disk to be used, which data is received by the receiving means, represents the read-only disk, and enabling the second process means to perform one of the writing process and the reading process for the readable/writable disk when the data representing the disk to be used, which data is received by the receiving means, represents the readable/writable disk.

In the disk drive system of the present invention in which a single disk drive for selectively treating a read-only disk and a readable/writable disk is connected via a bus to a host computer for controlling the disk drive and commands and data are transmitted between the host computer and the disk drive via the bus, the host computer transmits to the disk drive data representing a disk to be used and the disk drive receives from the host computer the data representing the disk to be used. A reading process for the read-only disk is performed when the received data representing the disk to be used represents the read-only disk, and a writing process or a reading process for the readable/writable disk is performed when the received data representing the disk to be used represents the readable/writable disk.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DETAILED DESCRIPTION OF THE PREFERRED EMBODIMENT

An embodiment of the present invention will now be described with reference to the accompanying drawings.

Figure 1:
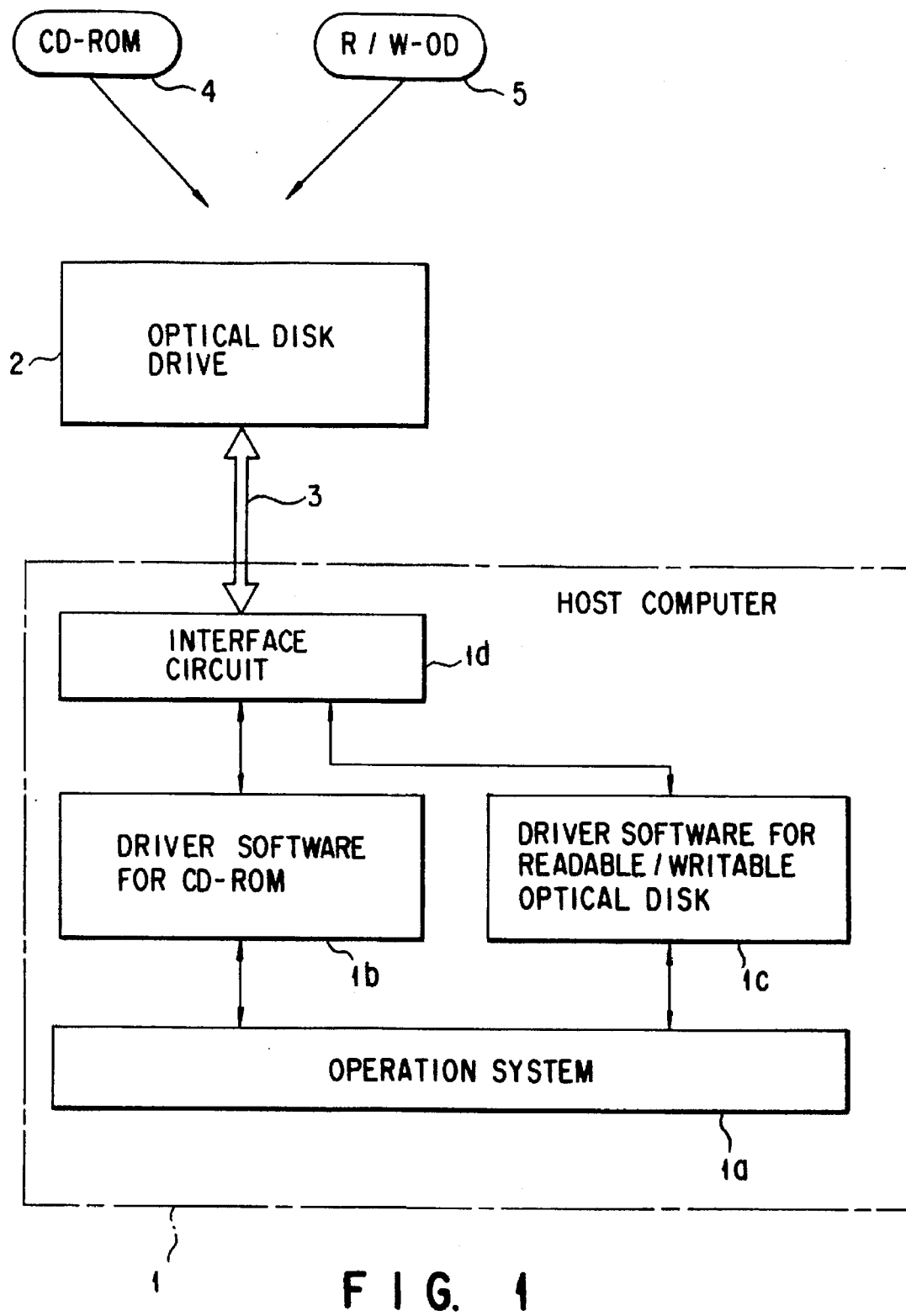
FIG. 1 schematically shows the structure of a disk drive system according to an embodiment of the present invention.

FIG. 1 schematically shows the structure of a disk drive system according to the invention. The disk drive system comprises a host computer 1 and an optical disk drive 2. The host computer 1 and optical disk drive 2 are connected by a bus 3 constituted by an SCSI (small computer system interface). Commands and data are transmitted between the host computer 1 and optical disk drive 2 via the bus 3.

The host computer 1 controls the optical disk drive 2, and particularly controls data write and data read. The host computer 1 comprises an operation system 1a, driver software 1b for a read-only disk (CD-ROM), driver software 1c for a readable/writable optical disk (R/W-OD), and an interface circuit 1d.

The optical disk drive 2 reads data from a read-only disk (CD-ROM) 4 by using a focused beam or writes and reads data on a readable/writable optical disk (R/W-OD) 5 by using a focused beam. Data to be written is fed from the host computer 1, and read data is fed to the host computer 1.

Figure 2:
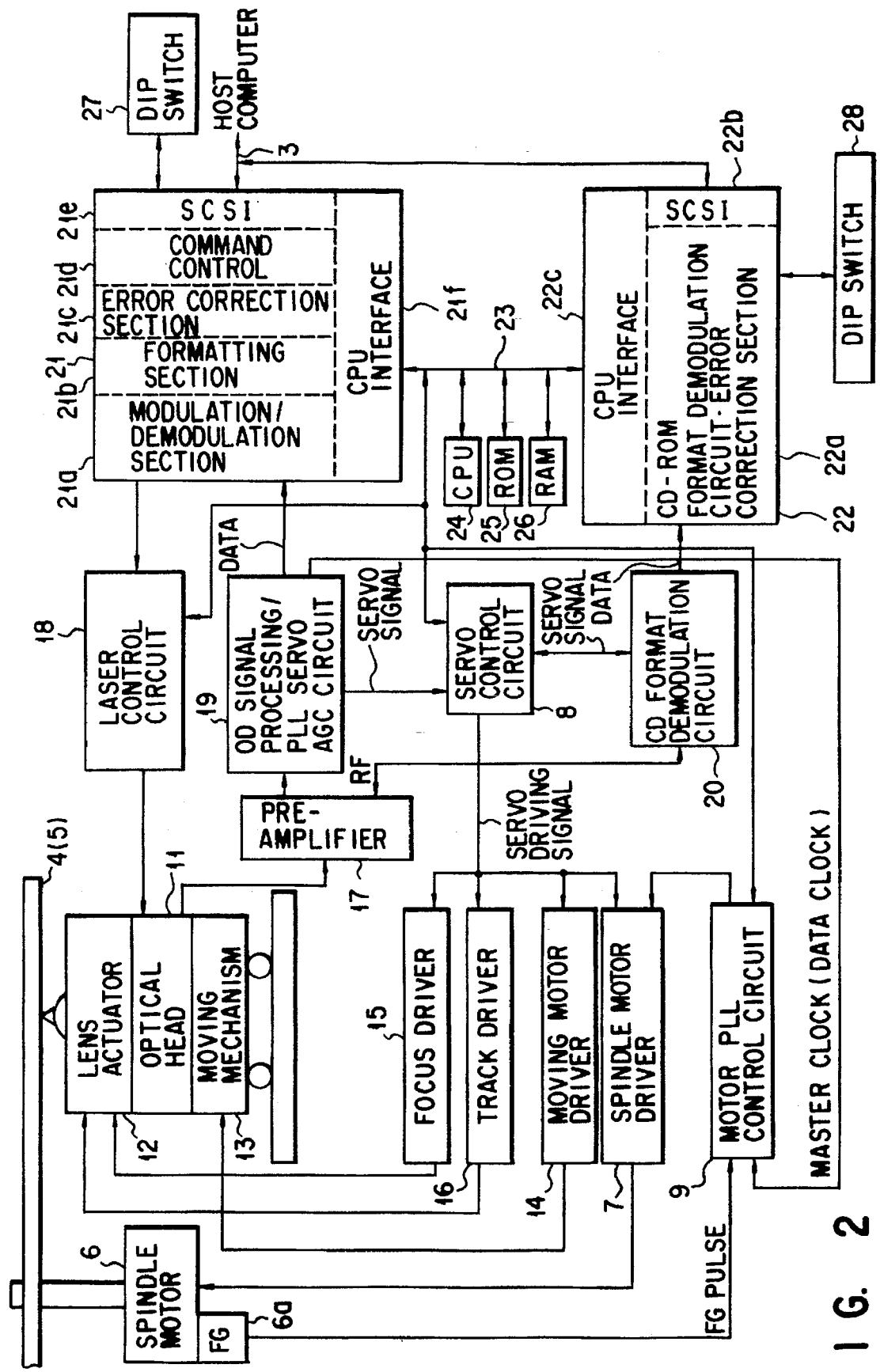
FIG. 2 schematically shows the structure of the disk drive shown in FIG. 1.

The structure of the optical disk drive 2 will now be described with reference to FIG. 2.

The disk 4 or 5 is rotated by a spindle motor 6, for example, at various speeds. The spindle motor 6 is driven by a spindle motor driver 7. The spindle motor driver 7 is controlled by a servo driving signal from a servo control circuit 8 and by a motor PLL control circuit 9. The motor PLL control circuit 9 controls the spindle motor driver 7 on the basis of an FG (frequency generation) pulse supplied from an FG unit 6a in accordance with the rotation of the spindle motor 6 and a master clock or a data clock from an OD (optical disk) signal processing/PLL (phase locked loop) servo AGC (automatic gain control) circuit 19 (described later).

Data reading from the disk 4 or data writing and reading on/from the disk 5 are effected by an optical head 11 provided below the disk 4 or 5.

The optical head 11 comprises a lens actuator 12 for moving an objective lens (not shown) in a focusing direction (parallel to the optical axis of the lens) or a tracking direction (perpendicular to the optical axis of the lens), a laser diode (not shown) for emitting a laser beam, and a photodetector (not shown) for outputting electric signals (used for focusing, tracking and data reproduction) corresponding to a reflection beam from the disk 4 or 5.

The laser diode of the optical head 11 is controlled by a laser control circuit 18 (described later). An output from the photodetector of the optical head 11 is delivered to a pre-amplifier 17.

A movable portion of a moving mechanism 13 for the optical head 11 is coupled to a moving motor (not shown). The moving motor is connected to a moving motor driver 14.

The moving motor of the moving mechanism 13 is driven by the moving motor driver 14, thereby moving the optical head 11 in a radial direction of the disk 4 or 5.

The lens actuator 12 is driven by a focus driver 15 and a track driver 16. The focus driver 15 and track driver 16 are controlled by the servo driving signal from the servo control circuit 8.

The laser control circuit 18 enables the laser diode to emit a laser beam corresponding to a read light amount for the CD-ROM disk 4 or enables the laser diode to emit a laser beam corresponding to a read light amount for the R/W-OD disk 5 in accordance with control signals from a CPU 24. In addition, in accordance with write pulses (source signals) from an R/W-OD interface circuit 21 (described later), the laser control circuit 18 drives the laser diode while the laser beam with the read light amount is being generated, thereby producing a laser beam with a write light amount for the R/W-OD disk 5.

The pre-amplifier 17 amplifies a detection signal from the photodetector within the optical head 11 and delivers a reference (RF) signal to the OD signal processing/PLL servo AGC circuit 19 and a CD (compact disk) format demodulation circuit 20.

The OD signal processing/PLL servo AGC circuit 19 receives the reference signal from the pre-amplifier 17 and outputs read data, a servo signal and a master clock or a data clock. The read data from the OD signal processing/PLL servo AGC circuit 19 is supplied to the R/W-OD interface circuit 21, the servo signal is supplied to the servo control circuit 8, and the master clock or data clock is supplied to the motor PLL control circuit 9.

The CD format demodulation circuit 20 receives the reference signal from the pre-amplifier 17 and outputs read data and a servo signal. The CD format demodulation circuit 20 restores data on the CD (disk) to code data which is arranged in a format capable of reproducing music information. The read data or musical code data output from the CD format demodulation circuit 20 is supplied to a CD-ROM interface circuit 22, and the servo signal is delivered to the servo control circuit 8.

The servo control circuit 8 is controlled by the CPU 24 and outputs servo driving signals such as a focusing signal and a tracking signal to the spindle motor driver 7, motor driver 14, focus driver 15 and track driver 16.

The CPU 24 entirely controls the optical disk drive 2. The CPU 24 is connected via a bus 23 to a ROM 25, a RAM 26, the servo control circuit 8, the laser control circuit 18, the R/W-OD interface circuit 21 and the CD-ROM interface circuit 22.

The R/W-OD interface circuit 21 includes a known 2–7 code modulation/demodulation section 21a, a format processing section 21b, an error correction processing section 21c, a command control 21d, an SCSI interface 21e, and a CPU interface 21f. In the R/W-OD interface circuit 21, the read data from the OD signal processing/ PLL servo AGC circuit 19 is subjected to 2–7 code demodulation in the 2–7 code modulation/demodulation section 21a, subjected to format processing in the format processing section 21b and subjected to error correction processing in the error correction processing section 21c. The resultant data is sent from the SCSI interface 21e to the host computer 1 via the SCSI bus 3.

In the R/W-OD interface circuit 21, the write data supplied from the host computer 1 to the SCSI interface 21e via the SCSI bus 3 is subjected to 2–7 code modulation in the 2–7 code modulation/demodulation section 21a. The resultant data is fed to the laser control circuit 18 as write pulses.

The CD-ROM interface circuit 22 includes a CD-ROM format demodulation/error correction section 22a, an SCSI interface 22b and a CPU interface 22c. In the CD-ROM interface circuit 22, the read data from the CD format demodulation circuit 20 is subjected to demodulation and error correction in the CD-ROM format demodulation/error correction section 22a. The resultant data is sent to the host computer 1 from the SCSI interface 22b via the SCSI bus 3.

The CD-ROM format demodulation/error correction section 22a converts the music code data format of the code data from the CD format demodulation circuit 20 to a final code data format in consideration of the error correction code, address, etc. (i.e. the CD-ROM format demodulation/ error correction section 22a has a double format construction).

The R/W-OD interface circuit 21 is connected to a dip switch 27. An address or an ID number is set as a set number in the dip switch 27 and, for example, "1" is set in the dip switch 27.

The CD-ROM interface circuit 22 is connected to a dip switch 28. An address or an ID number is set as a set number in the dip switch 28 and, for example, "0" is set in the dip switch 28.

The transmission of commands, data, etc. between the host computer 1 and optical disk drive 2 having the above construction will now be described with reference to the flow chart of FIG. 3.

In the initial state, as mentioned above, value "1" is set in the dip switch 27 for the R/W-OD, value "0" is set in the dip switch 28 for the CD-ROM, and the optical disk drive 2 is turned on.

For example, when a command is sent from the host computer 1 to the optical disk drive 2, the host computer 1 comes into an "ARBITRATION" state. The host computer 1 delivers via the signal line of the SCSI bus 3 an address or an ID number associated with the R/W-OD interface circuit 21 or CD-ROM interface circuit 22 within the optical disk drive 2 to be activated. The CPU 24 receives this address or ID number and compares, via the R/W-OD interface circuit 21 or CD-ROM interface circuit 22 within the optical disk drive 2, the address or ID number signal appearing on the signal line of the SCSI bus 3 with the address or ID number set in the dip switch 27 or 28. One of the R/W-OD interface circuit 21 and CD-ROM interface circuit 22 within the optical disk drive 2, which has the coincident ID number, enters a "SELECTION" state and tells to the host computer 1 that communication is permitted and the next command is acceptable. Thus, the interface circuit 21 or 22 enters the connected state.

Then, the selected one of the R/W-OD interface circuit 21 and CD-ROM interface circuit 22 within the optical disk drive 2 enters a message-in/command state, and an execution command is designated in the R/W-OD interface circuit 21 or CD-ROM interface circuit 22 within the optical disk drive 2.

Subsequently, the R/W-OD interface circuit 21 or CD-ROM interface circuit 22 associated with the address or ID number designated in the ARBITRATION state is operated, and the other interface circuit 22 or 21 not associated with the address or ID number is not operated.

If the operated R/W-OD interface circuit 21 or CD-ROM interface circuit 22 completes the operation of the designated command, the interface circuit 21 or 22 enters the status state and tells the completion of the operation to the host computer 1. Thus, the interface circuit 21 or 22 waits for the next ARBITRATION state.

For example, when the host computer 1 issues a command of the CD-ROM driver software 1b to the optical disk drive 2, the host computer 1 at first enters the ARBITRATION state and then sends the ID number "0" of the CD-ROM interface circuit 22 via the SCSI bus 3.

Figure 3:
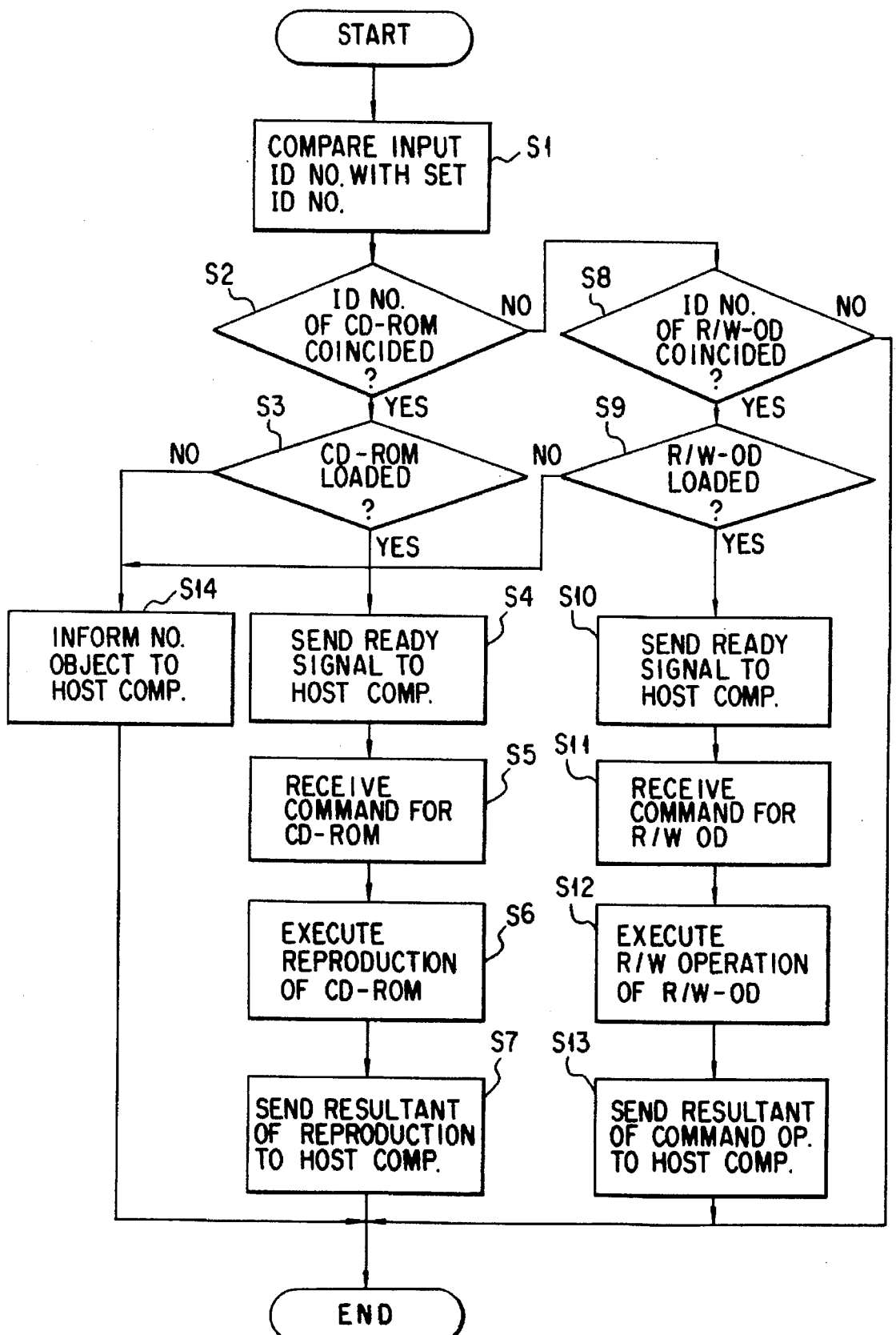
FIG. 3 is a flow chart illustrating the operation of the embodiment.

Then, in step S1 of FIG. 3, the CPU 24 compares, via the R/W-OD interface circuit 21, the ID number "0" represented by the signal appearing on the SCSI bus 3 with the ID number "1" set in the dip switch 27, and also compares, via the CD-ROM interface circuit 22, the ID number "0" represented by the signal appearing on the SCSI bus 3 with the ID number "0" set in the dip switch 28.

In this case, in step S2, the CPU 24 determines the coincidence of the ID number in the CD-ROM interface circuit 22, and enters the SELECTION state.

In this state, in step S3, the CPU 24 determines whether the CD-ROM 4 has been loaded in the drive section of the optical disk drive 2. If the CD-ROM 4 is loaded in the drive section of the optical disk drive 2, the CPU 24 goes to the next step S4.

In step S4, the CPU 24 sends to the host computer 1 a ready signal indicating that communication is permitted and the next command is acceptable. Thus, the CPU 24 enters the connected state.

Thereby, in step S5, the host computer 1 designates an execution command, e.g. a message and a command of read process execution for the CD-ROM disk 4, to the CD-ROM interface circuit 22.

Then, the CPU interface 22c of the CD-ROM interface circuit 22 outputs the content of the command to the CPU 24. The CPU 24 thus determines, in step S6, the read or reproduction process execution for the CD-ROM disk 4 and executes the read process for the CD-ROM disk 4 in accordance with the command.

Specifically, on the basis of the driver software 1b for the CD-ROM within the host computer 1, the CPU 24 controls the laser control circuit 18 and enables the laser diode within the optical head 11 to generate a laser beam for reading the CD-ROM disk 4. The CPU 24 controls the servo control circuit 8 to activate the focus driver 15, track driver 16, moving motor driver 14 and spindle motor driver 7, thereby moving the lens actuator 12 and moving mechanism 13 of the Optical head 11 and rotating the spindle motor 6 at a predetermined number of rotations.

An electric signal detected by the photodetector of the optical head 11 is amplified by the pre-amplifier 17 and converted to a reference (RF) signal. The reference signal is delivered to the CD format demodulation circuit 20 and supplied as read data (musical code data) to the CD-ROM interface circuit 22. The CD-ROM interface circuit 22 subjects the read data to format demodulation (the music code data format is converted to a final code data format in consideration of the error correction code, address, etc.) and error correction. Thereafter, in step S7, the read data is output to the host Computer 1 via the bus 3.

After the above read process is completed, the CPU 24 enters the status state and the CD-ROM interface circuit 22 tells the completion of the process to the host computer 1 and waits for the next ARBITRATION state.

When the host computer 1 issues a command of the R/W-OD driver software 1c to the optical disk device 2, the host computer 1 at first enters the ARBITRATION state and then sends the ID number "1" of the R/W-OD interface circuit 21 via the SCSI bus 3.

Then, in step S1, the CPU 24 compares, via the R/W-OD interface circuit 21, the ID number "1" represented by the signal appearing on the SCSI bus 3 with the ID number set in the dip switch 27, and also compares, via the CD-ROM interface circuit 22, the ID number "1" represented by the signal appearing on the SCSI bus 3 with the ID number set in the dip switch 28. In this case, since the ID number is not "0" in step S2, the process advances to step S8 and it is determined whether or not the input ID number is "1" which designates the R/W-OD 5.

In this case, the coincidence of the ID number is recognized in the R/W-OD interface circuit 21. If the loading of the R/W-OD 5 is sensed in step S9, the process goes to step S10 and a signal indicating that communication is permitted and the next command is acceptable is sent to the host computer 1. Thus, the interface circuit 21 enters the connected state.

Thereby, the control process goes to step S11 and the host computer 1 designates an execution command, e.g. a message and a command of read process execution or write process execution for the R/W-OD disk 5, to the R/W-OD interface circuit 21.

Then, the CPU interface 21f of the R/W-OD interface circuit 21 outputs the content of the command to the CPU 24. The CPU 24 thus determines the read process execution or the write process execution for the R/W-OD disk 5 and executes in step S12 the read or write process for the R/W-OD disk 5 in accordance with the command on the basis of the driver software 1c for the R/W-OD disk 5 within the host computer 1.

For example, in the case of the read process, the CPU 24 controls the laser control circuit 18 and enables the laser diode within the optical head 11 to generate a laser beam for reading the R/W-OD disk. The CPU 24 controls the servo control circuit 8 to activate the focus driver 15, track driver 16, moving motor driver 14 and spindle motor driver 7, thereby moving the lens actuator 12 and moving mechanism 13 of the optical head 11 and rotating the spindle motor 6 at a predetermined number of rotations.

An electric signal detected by the photodetector of the optical head 11 is amplified by the pre-amplifier 17 and converted to a reference (RF) signal. The reference signal is delivered to the OD signal processing/PLL servo AGC circuit 19 and supplied as read data to the R/W-OD interface circuit 21. The R/W-OD interface circuit 21 subjects the read data to format demodulation and error correction. Thereafter, in step S13, the read data is output to the host computer 1 via the bus 3.

After the above read process is completed, the CPU 24 enters the status state and the R/W-OD interface circuit 21 tells the completion of the process to the host computer 1 and waits for the next ARBITRATION state.

When the disk designated by the host computer 1 is not loaded in the optical disk drive 2, the control goes to step S14 from steps S3 and S9 and the CPU 24 sends a message "designated disk is not loaded, or no object (disk) is loaded" to the R/W-OD host computer 1 via the R/W-OD interface circuit 21 or the CD-ROM interface circuit 22. Thus, if a command not associated with the disk loaded in the optical disk drive 2 is transmitted from the host computer 1, the CPU 24 returns a status signal representing "No Disk" to the host computer 1 via the R/W-OD interface circuit 21 or CD-ROM interface 22.

In the above embodiment, the ID numbers of the R/W-OD and CD-ROM are preset in the dip switches 27 and 28 and the optical disk drive 2 functions as R/W-OD disk drive or CD-ROM disk drive in accordance with the command from the host computer 1. However, even if the addresses of the R/W-OD and CD-ROM are preset in the dip switches 27 and 28, this embodiment can operate similarly.

As has been described above, in the system of the present invention, the host computer transmits the address or ID number of the disk to be used to the disk drive, and the disk drive receives the address or ID number of the disk to be used from the host computer. If the received address or ID number of the disk to be used indicates the CD-ROM, the read process for the CD-ROM is executed. If the received address or ID number of the disk to be used indicates the R/W-OD, the write process or read process for the R/W-OD is executed.

Specifically, the address or ID number on the interface is made different between the case of treating the CD-ROM and the case of treating the R/W-OD. Thus, the host computer recognizes the single optical disk drive as if there are two different disk drives, and therefore the conventional device driver software can be used with no change on the host computer side.

In this case, if the host computer is provided in advance with the CD-ROM driver software and R/W-OD driver software, exclusive commands associated with their respective functions are prepared for their addresses or ID numbers. Thus, both driver software can be activated without confusion.

Accordingly, the host computer does not need to confirm which disk is loaded in the disk drive. The host computer only needs to designate the disk to be used and the host computer can use the conventional commands for the CD-ROMs and R/W-ODs. Therefore, the structure of the disk drive is simplified, the software processing on the host computer side is also simplified and the load of the software processing can be reduced.

As has been described above, there can be provided a disk drive system having a single disk drive wherein the host computer does not need to confirm which disk is loaded in the disk drive, the software processing on the host computer side is simplified and the load of the software processing can be reduced.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A disk drive system in which a disk drive for treating a read-only disk and a readable/writable disk is connected via a bus to a host computer for controlling the disk drive and commands and data are transmitted between the host computer and the disk drive via the bus, wherein said host computer comprises transmission means for transmitting to said disk drive data representing a disk to be used, and said disk drive comprises:
receiving means for receiving from the host computer the data representing the type of the disk to be used;
first process means for performing a reading process for the read-only disk;
second process means for performing one of a writing process and a reading process for the readable/writable disk; and
execution means for enabling said first process means to perform the reading process for the read-only disk when the data representing the disk to be used, which data is received by said receiving means, represents the read-only disk, and enabling said second process means to perform one of the writing process and the reading process for the readable/writable disk when the data representing the disk to be used, which data is received by said receiving means, represents the readable/writable disk.

2. The disk drive system according to claim 1, wherein said host computer includes a first driver software for treating said read-only disk and a second driver software for treating said readable/writable disk.

3. The disk drive system according to claim 1, wherein said execution means includes a data processor shared by said first and second process means.

4. A disk drive system in which a disk drive for treating a read-only disk and a readable/writable disk is connected via a bus to a host computer for controlling the disk drive and commands and data are transmitted between the host computer and the disk drive via the bus, wherein said host computer comprises transmission means for transmitting to said disk drive one of an address number and an ID number representing a disk to be used, and said disk drive comprises:

receiving means for receiving from the host computer one of said address number and ID number representing the type of the disk to be used;

first process means for performing a reading process for the read-only disk;

second process means for performing one of a writing process and a reading process for the readable/writable disk; and execution means for enabling said first process means to perform the reading process for the read-only disk when one of the address number and ID number representing the disk to be used, which one of the address number and ID number is received by said receiving means, represents the read-only disk, and enabling said second process means to perform one of the writing process and the reading process for the readable/writable disk when one of the address number and ID number representing the disk to be used, which one of the address number and ID number is received by said receiving means, represents the readable/writable disk.

5. The disk drive system according to claim 4, wherein said host computer includes a first driver software for treating said read-only disk and a second driver software for treating said readable/writable disk.

6. The disk drive system according to claim 4, wherein said execution means includes a data processor shared by said first and second process means.

7. A disk processing system in which a first device for treating a read-only disk and a readable/writable disk is connected via a bus to a second device for controlling the first device and commands and data are transmitted between the second device and the first device via the bus, wherein said second device comprises transmission means for transmitting to said first device data representing a disk to be used, and said first device comprises:

receiving means for receiving from the second device the data representing the type of the disk to be used;

first process means for performing a reading process for the read-only disk;

second process means for performing one of a writing process and a reading process for the readable/writable disk; and execution means for enabling said first process means to perform the reading process for the read-only disk when the data representing the disk to be used, which data is received by said receiving means, represents the read-only disk, and enabling said second process means to perform one of the writing process and the reading process for the readable/writable disk when the data representing the disk to be used, which data is received by said receiving means, represents the readable/writable disk.

8. The disk drive system according to claim 7, wherein said host computer includes a first driver software for treating said read-only disk and a second driver software for treating said readable/writable disk.

9. The disk drive system according to claim 7, wherein said execution means includes a data processor shared by said first and second process means.

10. A disk processing system in which a first device for treating a read-only disk and a readable/writable disk is connected via a bus to a second device for controlling the first device and commands and data are transmitted between the second device and the first device via the bus, wherein said second device comprises transmission means for transmitting to said first device one of an address number and an ID number representing a disk to be used, and said first device comprises:

receiving means for receiving from the second device one of the address number and ID number representing the type of the disk to be used;

first process means for performing a reading process for the read-only disk;

second process means for performing one of a writing process and a reading process for the readable/writable disk; and execution means for enabling said first process means to perform the reading process for the read-only disk when one of the address number and ID number representing the disk to be used, which one of the address number and ID number is received by said receiving means, represents the read-only disk, and enabling said second process means to perform one of the writing process and the reading process for the readable/writable disk when one of the address number and ID number representing the disk to be used, which one of the address number and ID number is received by said receiving means, represents the readable/writable disk.

11. The disk drive system according to claim 10, wherein said host computer includes a first driver software for treating said read-only disk and a second driver software for treating said readable/writable disk.

12. The disk drive system according to claim 10, wherein said execution means includes a data processor shared by said first and second process means.

13. A disk drive system in which a disk drive for treating a read-only optical disk and a readable/writable optical disk is connected via a bus to a host computer for controlling the disk drive and commands and data are transmitted between the host computer and the disk drive via the bus, wherein said host computer comprises transmission means for transmitting to said disk drive data representing the type of an optical disk to be used, and said disk drive comprises:

receiving means for receiving from the host computer the data representing the type of the optical disk to be used;

first process means for performing a reading process for the read-only optical disk;

second process means for performing one of a writing process and a reading process for the readable/writable optical disk; and execution means for enabling said first process means to perform the reading process for the read-only optical disk when the data representing the optical disk to be used, which data is received by said receiving means, represents the read-only optical disk, and enabling said second process means to perform one of the writing process and the reading process for the readable/writable optical disk when the data representing the optical disk to be used, which data is received by said receiving means, represents the readable/writable optical disk.

14. A disk drive system in which a disk drive for treating a read-only disk and a readable/writable disk is connected via a bus to a host computer for controlling the disk drive and commands and data are transmitted between the host computer and the disk drive via the bus, wherein the disk drive comprises:

receiving means for receiving from the host computer the data representing the disk to be used;

first process means for performing a reading process for the read-only disk;

second process means for performing one of a writing process and a reading process for the readable/writable disk; and execution means for enabling the first process means to perform the reading process for the read-only disk when the data representing the disk to be used, which data is received by the receiving means, represents the read-only disk, and enabling the second process means to perform one of the writing process and the reading process for the readable/writable disk when the data representing the disk to be used, which data is received by the receiving means, represents the readable/writable disk.

* * * * *